(12) United States Patent
Ly et al.

(10) Patent No.: US 10,993,176 B2
(45) Date of Patent: Apr. 27, 2021

(54) DISCOVERING PHYSICAL CELL IDENTIFIERS IN WIRELESS COMMUNICATIONS

(71) Applicant: QUALCOMM Incorporated, San Diego, CA (US)

(72) Inventors: Hung Ly, San Diego, CA (US); Joseph Binamira Soriaga, San Diego, CA (US); Tingfang Ji, San Diego, CA (US); Jing Jiang, San Diego, CA (US); Yang Yang, San Diego, CA (US); June Namgoong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/593,738

(22) Filed: Oct. 4, 2019

(65) Prior Publication Data
US 2020/0037235 A1 Jan. 30, 2020

Related U.S. Application Data

(63) Continuation of application No. 16/104,726, filed on Aug. 17, 2018, now Pat. No. 10,477,466, which is a
(Continued)

(51) Int. Cl.
*H04W 48/16* (2009.01)
*H04W 48/00* (2009.01)
(Continued)

(52) U.S. Cl.
CPC ........... *H04W 48/16* (2013.01); *H04L 5/0048* (2013.01); *H04W 48/00* (2013.01); *H04W 48/14* (2013.01);
(Continued)

(58) Field of Classification Search
CPC ..... H04W 8/16; H04W 8/005; H04W 72/042; H04W 84/14; H04W 48/00; H04L 5/0048; H04L 5/005
See application file for complete search history.

(56) References Cited

U.S. PATENT DOCUMENTS 8,131,215 B2   3/2012   Swope et al.
8,175,073 B1   5/2012   Hui et al.
(Continued)

FOREIGN PATENT DOCUMENTS

| CN | 104349420 A | 2/2015 |
|---|---|---|
| GB | 2512127 A | 9/2014 |
| WO | 2014120056 A1 | 8/2014 |

OTHER PUBLICATIONS

International Search Report and Written Opinion—PCT/US2017/023041—ISA/EPO—dated Jun. 9, 2017.
(Continued)

*Primary Examiner* — Brian T O'Connor
(74) *Attorney, Agent, or Firm* — QUALCOMM Incorporated

(57) ABSTRACT

Aspects of the present disclosure describe receiving, in a portion of bandwidth, a unified synchronization signal from one or more cells in a zone, and receiving, in the portion of bandwidth, a cell-specific signal from at least one cell of the one or more cells in the zone.

30 Claims, 8 Drawing Sheets

Related U.S. Application Data continuation of application No. 15/371,782, filed on Dec. 7, 2016, now Pat. No. 10,098,059.

(60) Provisional application No. 62/329,909, filed on Apr. 29, 2016.

(51) Int. Cl.

| | | |
|---|---|---|
| *H04W 48/14* | (2009.01) | |
| *H04L 5/00* | (2006.01) | |
| *H04J 11/00* | (2006.01) | |
| *H04W 8/00* | (2009.01) | |
| *H04W 48/08* | (2009.01) | |
| *H04W 48/10* | (2009.01) | |

(52) U.S. Cl.
CPC ........ *H04J 11/0069* (2013.01); *H04J 11/0073* (2013.01); *H04J 11/0079* (2013.01); *H04J 11/0093* (2013.01); *H04L 5/005* (2013.01); *H04L 5/0051* (2013.01); *H04W 8/005* (2013.01); *H04W 48/08* (2013.01); *H04W 48/10* (2013.01)

(56) References Cited

U.S. PATENT DOCUMENTS

| | | | |
|---|---|---|---|
| 8,718,117 | B2 | 5/2014 | Hiscock |
| 9,503,209 | B2 | 11/2016 | Chen et al. |
| 9,717,110 | B1 | 7/2017 | Gupta et al. |
| 9,769,838 | B2 | 9/2017 | You et al. |
| 9,843,986 | B2 | 12/2017 | Poitau et al. |
| 9,843,992 | B2 | 12/2017 | Thangarasa et al. |
| 10,098,059 | B2 | 10/2018 | Ly et al. |
| 10,225,875 | B2 * | 3/2019 | Seo ................... H04W 76/14 |
| 10,237,837 | B2 * | 3/2019 | Seo ................... H04W 56/00 |
| 10,271,295 | B2 * | 4/2019 | Tsai ................... H04L 5/005 |
| 10,349,365 | B2 * | 7/2019 | Seo ................... H04L 5/0048 |
| 10,517,052 | B2 * | 12/2019 | Hou ................... H04W 4/00 |
| 10,609,720 | B2 * | 3/2020 | Centonza ............ H04W 56/001 |
| 10,638,435 | B2 * | 4/2020 | Kim ................... H04W 88/02 |
| 10,687,252 | B2 * | 6/2020 | Manolakos ........... H04W 28/20 |
| 10,701,648 | B2 * | 6/2020 | Seo ................... H04L 27/2611 |
| 2004/0022299 | A1 | 2/2004 | Anglin |
| 2008/0291945 | A1 | 11/2008 | Luo |
| 2014/0294002 | A1 | 10/2014 | Kim et al. |
| 2015/0023191 | A1 | 1/2015 | Kim et al. |
| 2015/0215855 | A1 | 7/2015 | Yie et al. |
| 2016/0050617 | A1 | 2/2016 | Hwang et al. |
| 2016/0094374 | A1 | 3/2016 | Koorapaty et al. |
| 2016/0157080 | A1 | 6/2016 | Agiwal et al. |
| 2016/0192332 | A1 | 6/2016 | Koorapaty et al. |
| 2016/0270013 | A1 | 9/2016 | Soriaga et al. |
| 2016/0309401 | A1 | 10/2016 | Baek et al. |
| 2016/0337952 | A1 | 11/2016 | Li et al. |
| 2017/0078062 | A1 | 3/2017 | Park et al. |
| 2017/0367003 | A1 * | 12/2017 | Zhang ................. H04W 92/14 |
| 2018/0019904 | A1 | 1/2018 | Lee et al. |
| 2018/0359687 | A1 | 12/2018 | Ly et al. |

OTHER PUBLICATIONS

Nsn et al., "Discovery Signal Design", 3GPP TSG-RAN WG1 Meeting #77, R1-142441 DS Design, May 18, 2014, XP050789559, Retrieved from the Internet: URL:http://www.3gpp.org/ftp/Meetings_3GPP_SYNC/RAN1/RAN1/Docs/[retrieved on May 18, 2014], 6 pages.

ZTE: "Consideration on forward compatibility for new radio interface", 3GPP TSG RAN WG1 Meeting #84bis, R1-163392, Apr. 7, 2016, 5 pages.

\* cited by examiner

DISCOVERING PHYSICAL CELL IDENTIFIERS IN WIRELESS COMMUNICATIONS

CLAIM OF PRIORITY UNDER 35 U.S.C. § 119

The present Application for Patent is a continuation of application Ser. No. 16/104,726 entitled "DISCOVERING PHYSICAL CELL IDENTIFIERS IN WIRELESS COMMUNICATIONS" filed Aug. 17, 2018, which is a continuation of application Ser. No. 15/371,782 entitled "DISCOVERING PHYSICAL CELL IDENTIFIERS IN WIRELESS COMMUNICATIONS" filed Dec. 7, 2016, which claims priority to Provisional Application No. 62/329,909 entitled "DISCOVERING CELL IDENTIFIERS IN WIRELESS COMMUNICATIONS" filed Apr. 29, 2016, which are assigned to the assignee hereof and hereby expressly incorporated by reference herein for all purposes.

BACKGROUND

Aspects of the present disclosure relate generally to wireless communication systems, and more particularly, to wireless communication systems for indicating and discovering physical cell identifiers.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

For example, for 5G communications technology and beyond, current network-centric media access control (MAC) layer technologies may not provide a desired level of resource utilization and/or efficiency because of the various associated signal broadcasts. Further, these broadcasts consume power and may or may not be received or used by some or all of a cell's UEs. Additionally, a wireless communication system having a network-centric MAC layer also places relatively more of the network processing on user equipment (UE) (e.g., a UE identifies a first serving cell upon initially accessing the network, and then identifies and monitors handover targets (other serving cells) as part of its mobility management).

Thus, improvements in wireless communication systems may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communications is provided. The method includes receiving, in a portion of bandwidth, a unified synchronization signal from one or more cells in a zone, and receiving, in the portion of bandwidth, a cell-specific signal from at least one cell of the one or more cells in the zone.

In another example, an apparatus for wireless communications is provided. The apparatus includes a transceiver, a memory configured to store instructions, and a processor coupled to the transceiver and the memory. The processor is configured to execute the instructions to receive, in a portion of bandwidth, a unified synchronization signal from one or more cells in a zone, and receive, in the portion of bandwidth, a cell-specific signal from at least one cell of the one or more cells in the zone.

In another example, an apparatus for wireless communications is provided that includes means for receiving, in a portion of bandwidth, a unified synchronization signal from one or more cells in a zone, and means for receiving, in the portion of bandwidth, a cell-specific signal from at least one cell of the one or more cells in the zone.

In another example, a computer-readable medium storing code executable by a processor for wireless communications is provided. The code includes code for receiving, in a portion of bandwidth, a unified synchronization signal from one or more cells in a zone, and receiving, in the portion of bandwidth, a cell-specific signal from at least one cell of the one or more cells in the zone To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
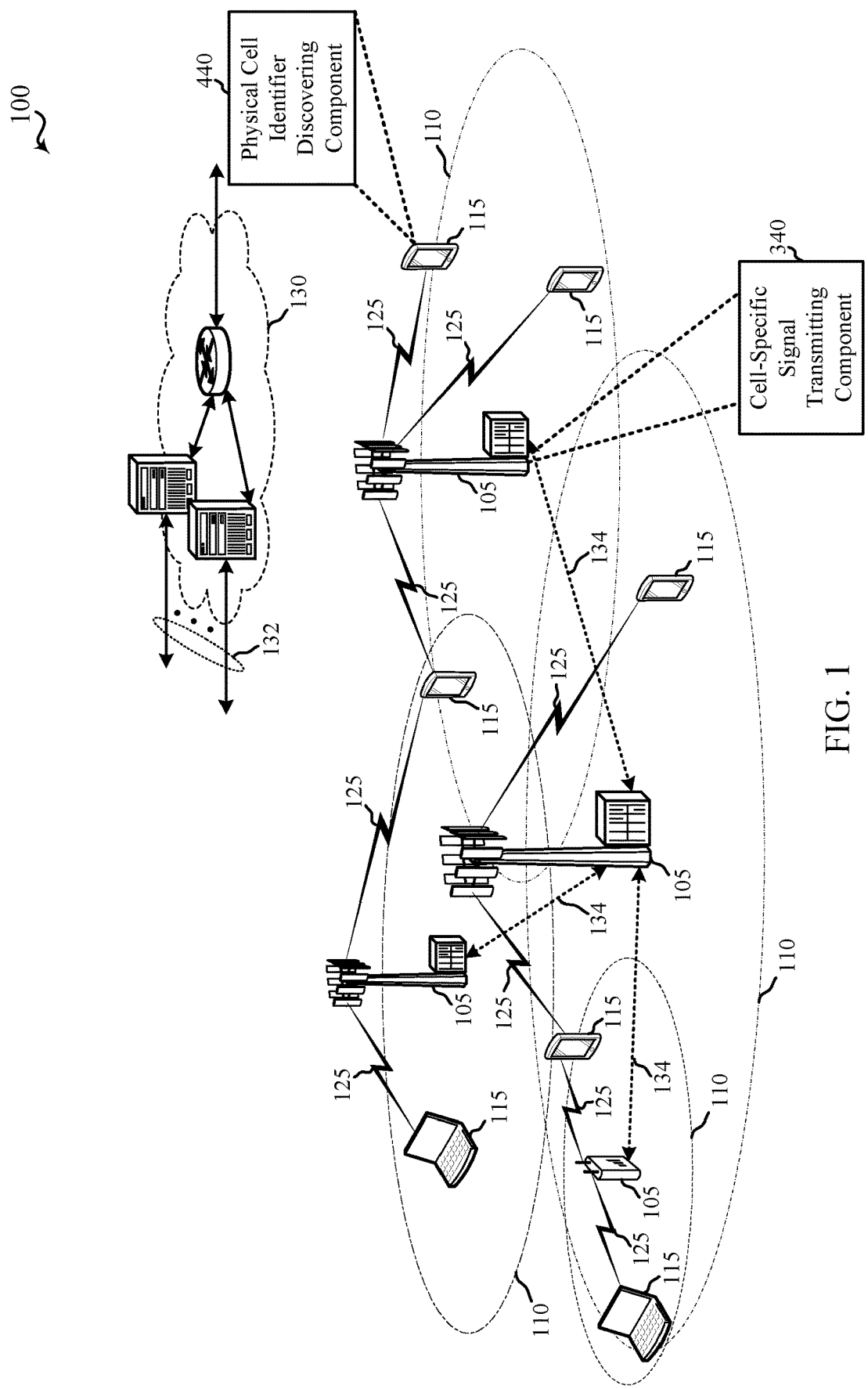
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to a wireless communication system having a user equipment (UE)-centric media access control (MAC) layer and/or for performing UE-centric or uplink-based mobility. For example, a wireless communication system having a UE-centric MAC layer may be advantageous, in some respects, in a time-domain duplex (TDD) system having a large antenna array, as the large antenna array may have limited coverage for broadcast channels (e.g., the channels that broadcast synchronization signals and system information in a wireless communication system having a network-centric MAC layer and/or for performing network-centric or downlink-based mobility). As described in the present disclosure, a wireless communication system having a UE-centric MAC layer and/or for providing UE-centric or uplink-based mobility may forego the broadcast of system information, as well as some cell-specific signals, and instead transmit these signals when requested by a UE.

In an example, cells of the network may broadcast synchronization signals to the UEs, where the synchronization signals may include an identifier of a zone. For example, a "cell" can refer to a base station, a carrier or component carrier associated with a base station, or a coverage area (e.g., sector, etc.) of a carrier or base station, depending on context. A zone may include a plurality of cells operating on the same frequency and/or with the same timing, etc., such that a handover from one cell to another within the zone may be controlled by the network and transparent to the UE. Accordingly, the UE may acquire a timing of cells within the zone (e.g., based on detecting zone-specific synchronization signals transmitted by one or more of the cells).

It may be advantageous, however, for the UE to determine physical cell identifiers specific to one or more cells within the zone (e.g., as opposed to only a physical identifier of the zone). For example, the cells may communicate control data encoded based on a physical cell identifier. As another example, the UE may desire to perform interference cancellation. As yet another example, the UE may desire to determine signal-to-noise ratio (SNR) of neighboring cells. As a further example, the UE may desire to perform mobility management. In such cases, the physical cell identifier of a serving cell for the UE and/or neighboring cells may assist in performing these (or other) functions.

As such, according to the present description, in one aspect, a cell may be configured to indicate its physical cell identifier to a UE by transmitting one or more cell-specific signals. In an example, the cell may transmit measurement reference signals (MRS) as the cell-specific signals to one or more UEs, where the MRS can include a physical cell identifier. For example, the MRS may be scrambled using the physical cell identifier, such that the UE may be configured to determine physical cell identifiers associated with one or more MRSs based on a scrambling sequence of the MRS(s). For example, the MRS can refer to a downlink cell-specific reference signal transmitted by a cell, which can be used for primary broadcast channel (PBCH) (or other channel) demodulation, downlink measurement for downlink based mobility, tracking loops (e.g., frequency tracking loops, time tracking loops, etc.).

In another example, the cell may transmit a cell-specific synchronization signal as the cell-specific signal that otherwise indicates the physical cell identifier (e.g., based on sequences having good cross-correlation properties such as m-sequences, Zadoff-Chu sequences, etc.). For example, the UE may determine a serving physical cell identifier based at least in part on attempting to decode a control channel from the serving cell based on one or more of the determined physical cell identifiers.

In addition, in yet another example, the network can determine a strongest cell for the UE (e.g., based on the cells measuring a strength of a signal received from the UE), and may transmit the cell-specific signal on the strongest cell. In this example, the UE may additionally or alternatively determine the serving cell as the cell from which the cell-specific signal is received. In some examples, the network may transmit the cell-specific signal from the strongest cell and/or cell-specific signals from other cells in the zone based on a request from the UE or other conditions, as described further herein.

The described features will be presented in more detail below with reference to FIGS. 1-8.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE), LTE-Advanced (LTE-A) are releases of UMTS that use E-UTRA. New Radio (NR) is a new release of UMTS. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., NR or LTE) communications over a shared radio frequency spectrum band. The techniques described herein are applicable to any next generation communications systems including 5th Generation (5G)/NR or LTE/LTE-A applications.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), gNodeB (gNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). Additionally, the plurality of base stations 105 may operate according to different ones of a plurality of communication technologies (e.g., 5G, fourth generation (4G)/LTE, 3G, Wi-Fi, Bluetooth, etc.), and thus there may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB) may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use hybrid automatic repeat/request (HARD) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, an appliance, an automobile, any other suitable "Internet of Things" (IoT) device, or the like. A UE may be able to communicate with various types of base stations and network equipment including macro eNBs, small cell eNBs, macro gNBs, small cell gNBs, relay base stations, and the like.

The wireless communication links 125 shown in wireless communication system 100 may carry uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each wireless communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The wireless communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers. Moreover, in some aspects, the wireless communication links 135 may represent one or more broadcast channels.

In aspects of the wireless communication system 100, the wireless communication system 100 may have a UE-centric MAC layer and/or for performing UE-centric or uplink-based mobility. On the network side, the base stations 105 may broadcast a synchronization signal. The synchronization signal may be a unified synchronization signal that is supported by systems using a UE-centric MAC layer (e.g., UECM networks), and/or for performing UE-centric or uplink-based mobility, as well as systems using a network-centric or non UE-centric MAC layer (e.g., nUECM networks), and/or for performing network-centric or downlink-based mobility. The UEs 115 may receive the synchronization signal, acquire a timing of the network from the synchronization signal, and in response to acquiring the timing of the network, transmit a pilot signal. The pilot signal transmitted by a UE 115 may be concurrently receivable by a plurality of cells (e.g., base stations) within the network. Each of the plurality of cells may measure a strength of the pilot signal, and the network (e.g., one or more of the base stations 105 and/or a central node within the core network 130) may determine a serving cell for the UE 115. As the UE 115 continues to transmit a pilot signal, the network may handover the UE 115 from one serving cell to another, with or without informing the UE 115. System information may be transmitted to UEs 115 on-demand (e.g., in response to a UE 115 transmitting a pilot signal), thus enabling the network to forego broadcasting the system information and enabling the network to conserve power.

The synchronization signal transmitted by the base stations 105 being unified, however, may not identify a given cell, but rather may identify (e.g., by indicating a zone identifier in the signal) a zone of multiple cells operating on the same frequency and/or with the same timing, etc., as described further herein. There may be instances, however, where a UE 115 may benefit from knowing physical cell identifiers of a serving cell, neighboring cell, etc. within (or outside of) the zone. Accordingly, the base stations 105 may also separately transmit cell-specific signals. For example, the base stations 105 may transmit measurement reference signals (MRS), which may be scrambled based on a physical cell identifier. Alternatively or in addition, the base stations 105 may separately transmit cell-specific synchronization signals, which may be generated based on a sequence that indicates the physical cell identifier. UE 115 can receive the cell-specific signals from one or more base stations 105 and identify corresponding cells based at least in part on determining the physical cell identifier that corresponds to the cell-specific signals (e.g., based on determining an MRS scrambling code, cell-specific synchronization signal sequence, etc.). In another example, the cell determined as the serving cell for the UE 115, as described above, may transmit the cell-specific signal (e.g., in response to the pilot signal from the UE 115) to facilitate serving cell discovery by the UE 115.

In aspects of the wireless communication system 100, a base station 105 may include a cell-specific signal transmitting component 340 (see e.g., FIG. 3) configured to determine whether to transmit a cell-specific signal to one or more UEs. The determination can be based at least in part on determining whether the base station 105 receives a pilot signal from the UE 115 at a highest power (e.g., at a highest received signal strength indicator (RSSI), reference signal received power (RSRP), reference signal received quality (RSRQ), SNR, etc.) compared to other base stations 105 (e.g., at a higher power than received by other base stations in the same zone). Thus, in one example, base stations in a zone can communicate the power at which the pilot signal is received to coordinate and determine one (or more) base station(s) as the serving base station(s) for the UE 115. In another example, base station 105 can transmit the cell-specific signal in response to the pilot signal from the UE 115 or other detected event, in a periodic manner, and/or the like. In an example, the cell-specific signal transmitting component 340 can scramble a MRS based on a physical cell identifier such that the UE can identify the cell transmitting the MRS. In another example, the cell-specific signal transmitting component 340 can generate a cell-specific synchronization signal based on a sequence that indicates the physical cell identifier, such that the UE can identify the cell transmitting the cell-specific synchronization signal.

In other aspects of the wireless communication system 100, a UE 115 may include a physical cell identifier discovering component 440 configured to determine whether to discover a physical cell identifier of one or more cells, which may be based on a detected event, in a periodic manner, etc. For example, physical cell identifier discovering component 440 may determine to discover a physical cell identifier based on receiving a positive paging indicator (such as a keep alive message) from the one or more cells, receiving the synchronization signal from one or more cells in a zone, determining to cancel interference from one or more neighboring cells, detecting a threshold change in signal-to-noise ratio, determining to perform mobility management, etc. In an example, physical cell identifier discovering component 440 may determine physical cell identifiers based on cell-specific signals received from various cells (e.g., from one or more base stations). Alternatively or in addition, physical cell identifier discovering component 440 may determine a serving physical cell identifier and/or may determine one or more neighboring physical cell identifiers, as described further herein.

Figure 2:
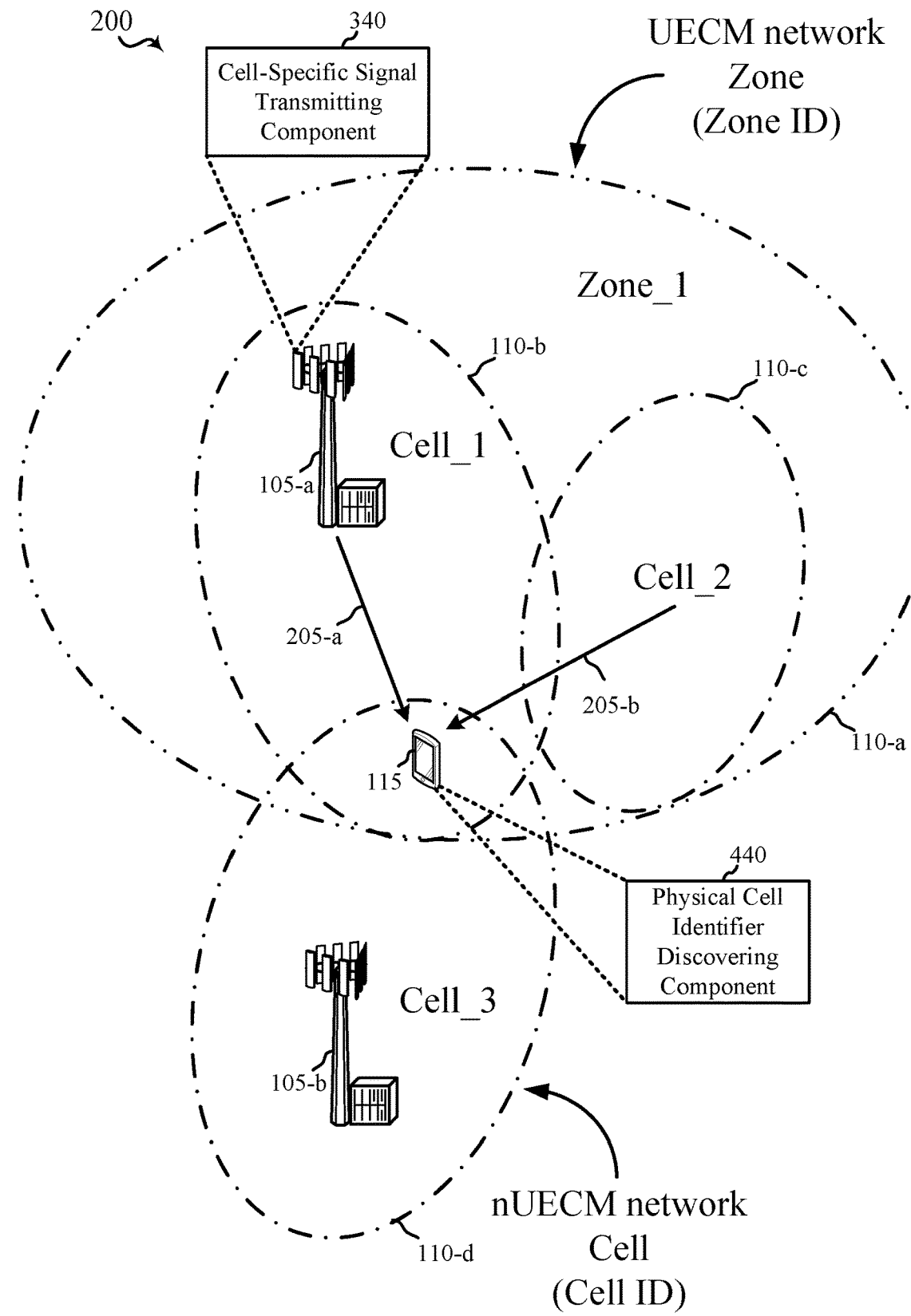
FIG. 2 illustrates an example of a zone of cells in a user equipment (UE)-centric media access control (MAC) (UECM) network in accordance with various aspects of the present disclosure.

FIG. 2 shows a diagram 200 illustrating a UECM network zone (e.g., zone_1) having a coverage area 110-*a* and including at least a cell_1 having a coverage area 110-*b* and a cell_2 having a coverage area 110-*c*. The UECM network zone may be a zone associated with at least a portion of the wireless communication system 100 described in FIG. 1. A zone, such as zone_1, may refer to a group or combination of cells that act together and are highly synchronized (e.g., based on being provided by the same base station, synchronizing timing between associated base stations over a backhaul link, etc.). Because of the coordinated operation of the cells in a zone, the synchronization signals are zone-specific. That is, the synchronization signals transmitted (e.g., broadcast) from a zone are typically single-frequency network (SFN) synchronization signals. A single-frequency network is a broadcast network where several transmitters simultaneously send the same signal over the same frequency channel.

The use of zones in 5G networks or other next generation communication systems may be advantageous for mobility management operations. For example, when in a zone, cell reselection may be transparent to a UE. The network may be responsible for cell reselection and mobility, and the UE can be relieved from those responsibilities. Such an approach may be efficient for the UE, and also can be efficient for the network because the number of mobility messages that need to be exchanged with a UE may be reduced.

The use of zones in 5G networks or other next generation communication systems may also enable certain applications such as massive MIMO, for example. Massive MIMO, which is also known as Large-Scale Antenna Systems, Very Large MIMO, Hyper MIMO, Full-Dimension MIMO and ARGOS, makes use of a very large number of service antennas (e.g., hundreds or thousands) that are operated fully coherently and adaptively. Extra antennas may help by focusing the transmission and reception of signal energy into smaller regions improving throughput and energy efficiency, in particularly when combined with simultaneous scheduling of a large number of user terminals (e.g., tens or hundreds). Massive MIMO was originally envisioned for time division duplex (TDD) operation, but can potentially be applied also in frequency division duplex (FDD) operation. Massive MIMO may provide additional benefits, including the use of inexpensive low-power components, reduced latency, simplification of the MAC layer, and robustness to interference and intentional jamming.

Also shown in FIG. 2 is a UE 115 located in an overlapping area or region between the UECM network zone and an nUECM network cell (e.g., cell_3 having coverage area 110-*d*). The nUECM network cell may be a cell associated with at least a portion of a wireless communication system having a network-centric MAC layer. The UE 115 in the overlapping area may receive unified synchronization signals from base station 105-*a* in cell_1 of zone_1 and/or from base station 105-*b* in cell_3. In other words, the UE 115 in the overlapping area may receive synchronization signals from a UECM network zone (e.g., cell_1 in zone_1) and/or from an nUECM network cell (e.g., cell_3). For example, base station 105-*a* may generate and transmit (e.g., broadcast) unified synchronization signals, which may identify zone_1 and/or cell_1, as well as a nominal tone spacing being used by zone_1. Moreover, base station 105-*b* may transmit (e.g., broadcast) unified synchronization signals, which may identify cell_3.

After receiving the unified synchronization signals, whether from a UECM network zone or an nUECM network cell, the UE 115 in the overlapping area may process the unified synchronization signals to determine whether the network transmitting the signals is a UECM network or an nUECM network. The UE 115 may also detect, where the network is a UECM network, a nominal numerology (e.g., tone spacing) being used by the network. The UE 115 may detect the nominal numerology based on a number of copies of the unified synchronization signals received from a UECM network.

As described, however, the unified synchronization signals may identify the zone, but may not identify the cell from which the signal is transmitted. As such, base station 105-*a* in cell_1 may also transmit, via a cell-specific signal transmitting component 340 (see e.g., FIG. 3), a cell-specific signal 205-*a* where the cell-specific signal can indicate a physical cell identifier of cell_1.

Similarly, for example, a cell-specific signal 205-*b* related to cell_2 can also be transmitted. For instance, a cell-specific signal 205-*b* related to cell_2 can be transmitted from base station 105-*a* or another base station associated with cell_2 in zone_1 110-*a* where the cell-specific signal 205-*b* can indicate a physical cell identifier of cell_2. For example, the cell-specific signals may include MRSs that are scrambled using a scrambling code that is associated with the physical cell identifier. In another example, the cell-specific signals may include cell-specific synchronization signals that are generated using a sequence (e.g., a binary sequence, m-sequence, Zadoff-Chu sequence, etc.) that is associated with the physical cell identifier.

Accordingly, UE 115 can receive the cell-specific signal(s) 205-*a* and/or 205-*b* from cell_1 and/or cell_2, and may identify one or more of the cells based on the corresponding cell-specific signal(s). In another example, UE 115 may identify a serving cell as one of cell_1 or cell_2 based on a received cell-specific signal, and/or may determine one or more neighboring physical cell identifiers, as described herein.

Figure 3:
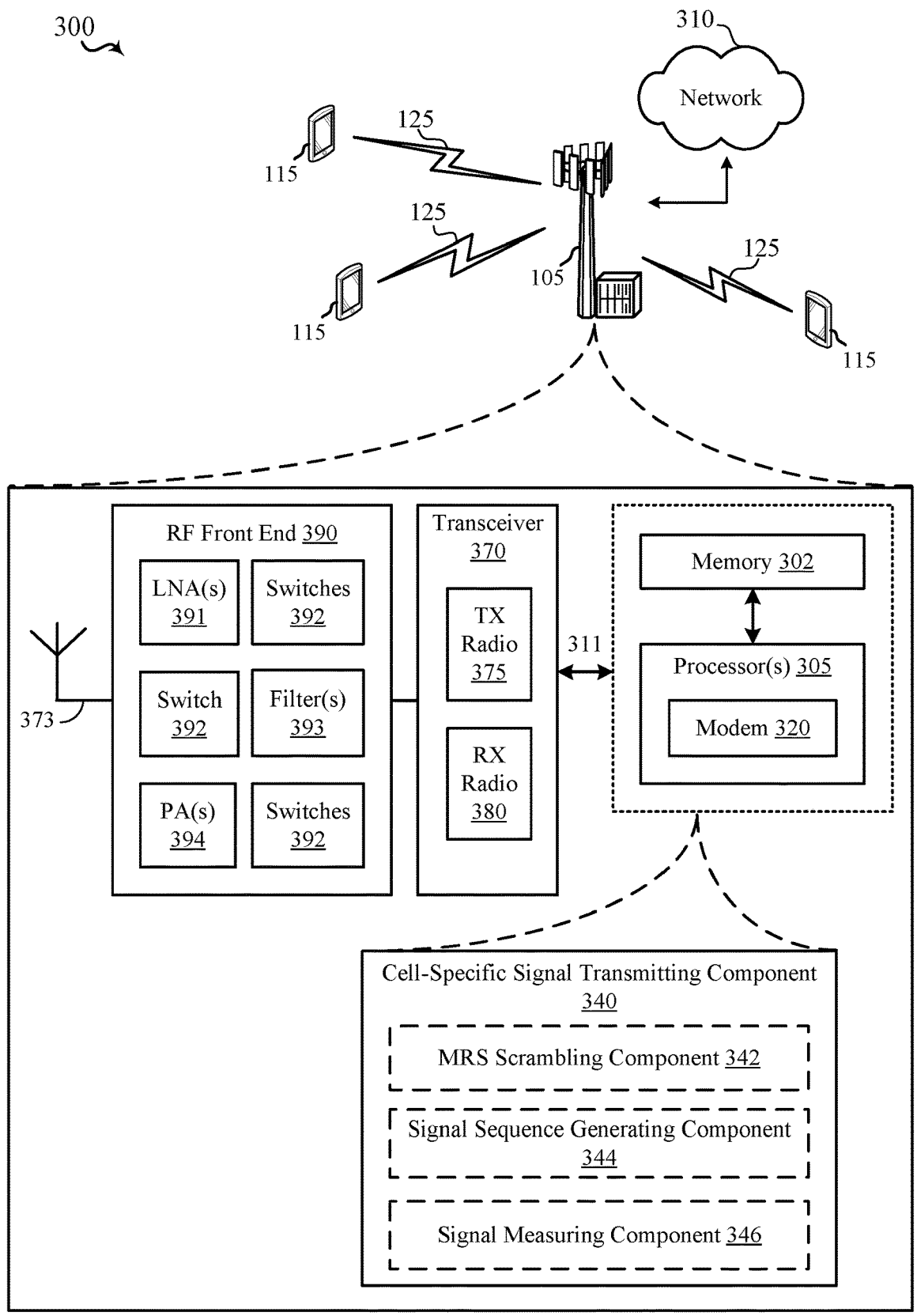
FIG. 3 is a block diagram illustrating an example of a base station, in accordance with various aspects of the present disclosure.
Figure 4:
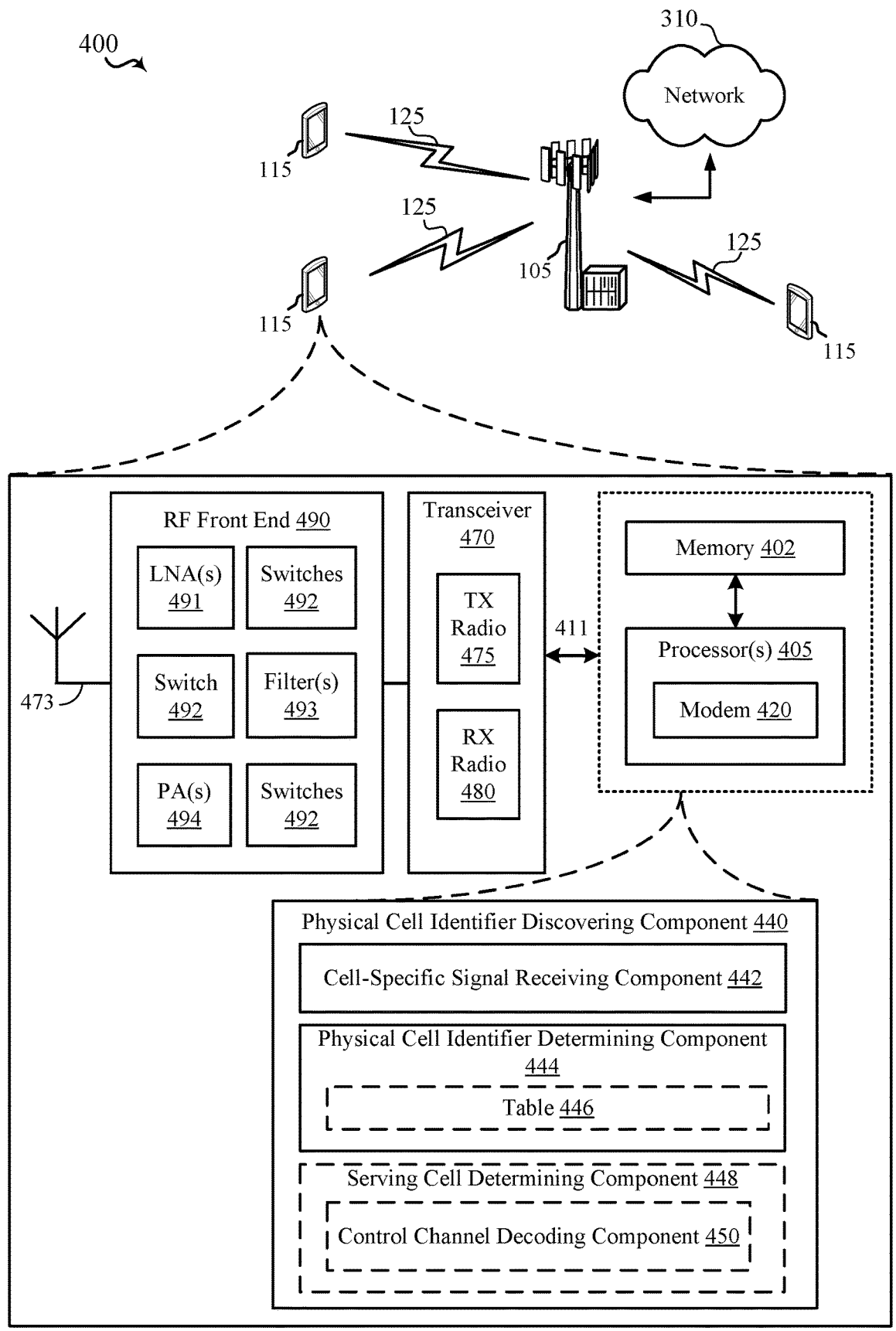
FIG. 4 is a block diagram illustrating an example of a UE, in accordance with various aspects of the present disclosure.
Figure 5:
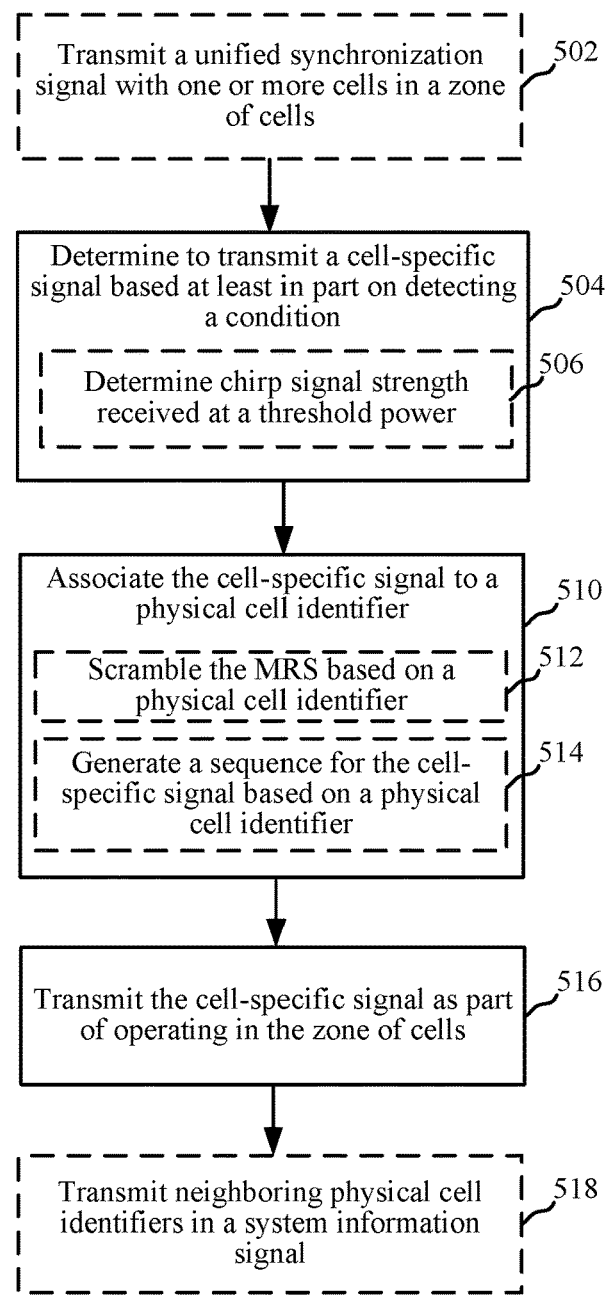
FIG. 5 is a flow chart illustrating an example of a method for transmitting measurement reference signals, in accordance with various aspects of the present disclosure.
Figure 6:
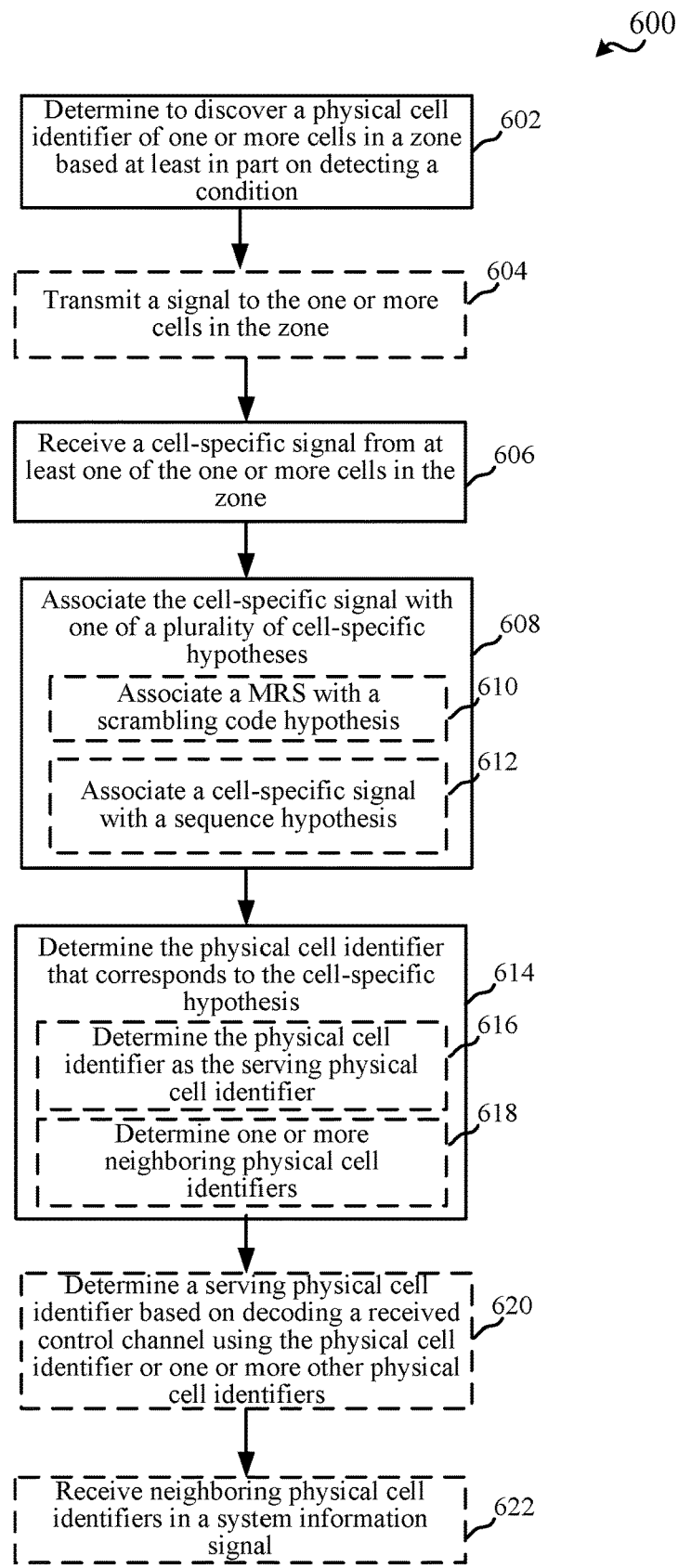
FIG. 6 is a flow chart illustrating an example of a method for discovering physical cell identifiers, in accordance with various aspects of the present disclosure.

Turning now to FIGS. 3-6, aspects are depicted with reference to one or more components and one or more methods that may perform the actions or operations described herein, where aspects in dashed line may be optional. Although the operations described below in FIGS. 5 and 6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 3, a block diagram 300 is shown that includes a portion of a wireless communications system having multiple UEs 115 in communication with a base station 105 via wireless communication links 125, where the base station 105 is also connected to a network 310. The UEs 115 may be examples of the UEs described in the present disclosure that are configured to receive and process unified synchronization signals. Moreover the base station 105 may be an example of the base stations described in the present disclosure that are configured to generate and transmit cell-specific signals. In an example, the base station 105 in FIG. 3 may be part of a UECM network and may transmit cell-specific signals that indicate a physical cell identifier.

In an aspect, the base station in FIG. 3 may include one or more processors 305 and/or memory 302 that may operate in combination with cell-specific signal transmitting component 340 to perform the functions, methodologies (e.g., method 500 of FIG. 5), or methods presented in the present disclosure. In accordance with the present disclosure, the cell-specific signal transmitting component 340 may include an optional MRS scrambling component 342 configured for scrambling an MRS, an optional signal sequence generating component 344 configured for generating a sequence for a cell-specific reference signal (e.g., a binary sequence), and/or an optional signal measuring component 346 configured for measuring a signal received from UE 115 to determine whether to transmit the MRS.

The one or more processors 305 may include a modem 320 that uses one or more modem processors. The various functions related to the cell-specific signal transmitting component 340, and/or its sub-components, may be included in modem 320 and/or processor 305 and, in an aspect, can be executed by a single processor, while in other aspects, different ones of the functions may be executed by a combination of two or more different processors. For example, in an aspect, the one or more processors 305 may include any one or any combination of a modem processor, a baseband processor, a digital signal processor, a transmit processor, a transceiver processor associated with transceiver 370, a system-on-chip (SoC), etc. In particular, the one or more processors 305 may execute functions and components included in the cell-specific signal transmitting component 340.

In some examples, the cell-specific signal transmitting component 340 and each of the sub-components may comprise hardware, firmware, and/or software and may be configured to execute code or perform instructions stored in a memory (e.g., a computer-readable storage medium, such as memory 302 discussed below). Moreover, in an aspect, the base station 105 in FIG. 3 may include a radio frequency (RF) front end 390 and transceiver 370 for receiving and transmitting radio transmissions to, for example, UEs 115. The transceiver 370 may coordinate with the modem 320 to transmit messages generated by the cell-specific signal transmitting component 340 (e.g., MRSs, cell-specific synchronization signals, etc.) to the UEs. RF front end 390 may be connected to one or more antennas 373 and can include one or more switches 392, one or more amplifiers (e.g., power amplifiers (PAs) 394 and/or low-noise amplifiers 391), one or more filters 393, etc. for transmitting and receiving RF signals on uplink channels and downlink channels. In an aspect, the components of the RF front end 390 can connect with transceiver 370. The transceiver 370 may connect to one or more of modem 320 and processors 305.

The transceiver 370 may be configured to transmit (e.g., via transmitter (TX) radio 375) and receive (e.g., via receiver (RX) radio 380) wireless signals through antennas 373 via the RF front end 390. In an aspect, the transceiver 370 may be tuned to operate at specified frequencies such that the base station 105 can communicate with, for example, UEs 115. In an aspect, for example, the modem 320 can configure the transceiver 370 to operate at a specified frequency and power level based on the configuration of the base station 105 and communication protocol used by the modem 320.

The base station 105 in FIG. 3 may further include a memory 302, such as for storing data used herein and/or local versions of applications or cell-specific signal transmitting component 340 and/or one or more of its sub-components being executed by processor 305. Memory 302 can include any type of computer-readable medium usable by a computer or processor 305, such as random access memory (RAM), read only memory (ROM), tapes, magnetic discs, optical discs, volatile memory, non-volatile memory, and any combination thereof. In an aspect, for example, memory 302 may be a computer-readable storage medium that stores one or more computer-executable codes defining cell-specific signal transmitting component 340 and/or one or more of its sub-components. Additionally or alternatively, the base station 105 may include a bus 311 for coupling one or more of the RF front end 390, the transceiver 374, the memory 302, or the processor 305, and to exchange signaling information between each of the components and/or sub-components of the base station 105.

In an aspect, the processor(s) 305 may correspond to one or more of the processors described in connection with the base station in FIG. 8. Similarly, the memory 302 may correspond to the memory described in connection with the base station in FIG. 8.

Referring to FIG. 4, a block diagram 400 is shown that includes a portion of a wireless communications system having multiple UEs 115 in communication with a base station 105 via wireless communication links 125, where the base station 105 is also connected to a network 310. The UEs 115 may be examples of the UEs described in the present disclosure that are configured to receive and process cell-specific signals. Moreover the base station 105 may be an example of the base stations described in the present disclosure that are configured to generate and transmit cell-specific signals. In an example, the base station 105 in FIG. 3 may be part of a UECM network or an nUECM network and may transmit cell-specific signals that identify a related cell.

In an aspect, the UE 115 in FIG. 4 may include one or more processors 405 and/or memory 402 that may operate in combination with physical cell identifier discovering component 440 to perform the functions, methodologies (e.g., method 600 of FIG. 6), or methods presented in the present disclosure. In accordance with the present disclosure, the physical cell identifier discovering component 440 may include a cell-specific signal receiving component 442 configured for receiving one or more cell-specific signals, a physical cell identifier determining component 444 configured for determining a physical cell identifier indicated by the one or more cell-specific signals, and/or an optional serving cell determining component 448 configured for determining an identifier of a serving cell serving UE 115. In an example, physical cell identifier determining component 444 may optionally include a table 446 that maps MRS scrambling codes and/or cell-specific synchronization signal sequences to corresponding physical cell identifiers. For example, table 446 may be stored on memory 402, received in a configuration from one or more network components (e.g., base station 105 or other base stations), etc. In addition, serving cell determining component 448 may optionally include a control channel decoding component 450 configured for decoding a control channel received from one or more cells based on a determined physical cell identifier to identify a serving cell serving the UE 115.

The one or more processors 405 may include a modem 420 that uses one or more modem processors. The various functions related to the physical cell identifier discovering component 440, and/or its sub-components, may be included in modem 420 and/or processor 405 and, in an aspect, can be executed by a single processor, while in other aspects, different ones of the functions may be executed by a combination of two or more different processors. For example, in an aspect, the one or more processors 405 may include any one or any combination of a modem processor, a baseband processor, a digital signal processor, a transmit processor, a transceiver processor associated with transceiver 470, a system-on-chip (SoC), etc. In particular, the one or more processors 405 may execute functions and components included in the physical cell identifier discovering component 440.

In some examples, the physical cell identifier discovering component 440 and each of the sub-components may comprise hardware, firmware, and/or software and may be configured to execute code or perform instructions stored in a memory (e.g., a computer-readable storage medium, such as memory 402 discussed below). Moreover, in an aspect, the UE 115 in FIG. 4 may include an RF front end 490 and transceiver 470 for receiving and transmitting radio transmissions to, for example, base stations 105. The transceiver 470 may coordinate with the modem 420 to receive cell-specific signals to be processed by the physical cell identifier discovering component 440 (e.g., cell-specific signals 205-*a* and/or 205-*b* in FIG. 2). RF front end 490 may be connected to one or more antennas 473 and can include one or more switches 492, one or more amplifiers (e.g., PAs 494 and/or LNAs 491), and one or more filters 493 for transmitting and receiving RF signals on uplink channels and downlink channels. In an aspect, the components of the RF front end 490 can connect with transceiver 470. The transceiver 470 may connect to one or more of modem 420 and processors 405.

The transceiver 470 may be configured to transmit (e.g., via transmitter (TX) radio 475) and receive (e.g., via receiver (RX) radio 480) wireless signals through antennas 473 via the RF front end 490. In an aspect, the transceiver 470 may be tuned to operate at specified frequencies such that the UE 115 can communicate with, for example, base stations 105. In an aspect, for example, the modem 420 can configure the transceiver 470 to operate at a specified frequency and power level based on the configuration of the UE 115 and communication protocol used by the modem 420.

The UE 115 in FIG. 4 may further include a memory 402, such as for storing data used herein and/or local versions of applications or physical cell identifier discovering component 440 and/or one or more of its sub-components being executed by processor 405. Memory 402 can include any type of computer-readable medium usable by a computer or processor 405, such as RAM, ROM, tapes, magnetic discs, optical discs, volatile memory, non-volatile memory, and any combination thereof. In an aspect, for example, memory 402 may be a computer-readable storage medium that stores one or more computer-executable codes defining physical cell identifier discovering component 440 and/or one or more of its sub-components. Additionally or alternatively, the UE 115 may include a bus 411 for coupling one or more of the RF front end 490, the transceiver 474, the memory 402, or the processor 405, and to exchange signaling information between each of the components and/or sub-components of the UE 115.

In an aspect, the processor(s) 405 may correspond to one or more of the processors described in connection with the UE in FIG. 8. Similarly, the memory 402 may correspond to the memory described in connection with the UE in FIG. 8.

FIG. 5 illustrates a flow chart of an example of a method 500 for transmitting (e.g., from a base station), one or more cell-specific signals to one or more UEs, where the cell-specific signals can identify a corresponding cell.

At Block 502, method 500 may optionally include transmitting a unified synchronization signal with one or more cells in a zone of cells. In an aspect, transceiver 370, e.g., in conjunction with processor(s) 305 and/or memory 302, can transmit the unified synchronization signal with the one or more cells in the zone of cells. In an aspect, the cells can communicate to operate within the zone such as to operate on the same frequency and/or with the same timing, etc. For example, the cells may synchronize frequency and/or timing based on being provided by the same base station. As another example, the cells may synchronize frequency and/or timing by communicating with base stations providing the cells via a backhaul link. The cells may also coordinate transmission of the unified synchronization signal to allow a UE, such as UE 115, to receive the synchronization signal and accordingly synchronize communications with the zone of cells for communicating therewith. In an example, the UE, based on receiving the unified synchronization signal, can transmit a pilot signal, chirp signal, etc. for receiving by the zone of cells to request additional parameters for communicating with the zone of cells. The unified synchronization signal, as described, may indicate an identifier of the zone but may not indicate an identifier of the cell of base station 105 (e.g., and/or one or more of the other cells in the zone) transmitting the synchronization signal.

At Block 504, method 500 includes determining to transmit a cell-specific signal based at least in part on detecting a condition. In an aspect, cell-specific signal transmitting component 340, e.g., in conjunction with processor(s) 305, memory 302, and/or transceiver 370, can determine to transmit a cell-specific signal based at least in part on detecting the condition. For example, the condition may relate to receiving a request for a cell-specific signal from the UE 115; in this example, cell-specific signal transmitting component 340 can receive the request from the UE 115, which may include a request in a pilot signal. For example, UE 115 may transmit a pilot signal to request on-demand transmission of cell-specific signals, such as MRS, cell-specific synchronization signals, system information signals, etc. from base station 105.

In one example, UE 115 can operate in a radio resource control (RRC)-common state where the UE is camped on a cell of a base station 105 but may be inactive and periodically waking up to monitor for paging signals from the base station. In another example, UE 115 may discover the zone of cells based on receiving a unified synchronization signal. In either state, UE 115 can transmit a pilot signal for the purpose of requesting cell-specific signals or other reference signals from the base station 105 (or for other purposes, such as requesting to perform random access). For example, the pilot signal may be referred to as a chirp signal, which can be sent for a specific purpose where the purpose may be indicated in the chirp signal (e.g., a purpose to request reference signal, request a random access procedure, request on-demand system information, support mobility tracking, etc.). In any case, cell-specific signal transmitting component 340 may determine to transmit the cell-specific signal based on receiving one or more signals from UE 115. In another example, cell-specific signal transmitting component 340 may determine to transmit the cell-specific signal based on another event and/or periodically based on a configured interval, duration, etc.

In an example, determining to transmit the cell-specific signal at Block 504 may optionally include, at Block 506, determining a chirp signal strength received at a threshold power. In an aspect, signal measuring component 346, e.g., in conjunction with processor(s) 305, memory 302, and/or transceiver 370, can determine the chirp signal strength received at a threshold power. For example, signal measuring component 346 can determine the strength (e.g., RSSI, RSRP, RSRQ, SNR, etc.) of the chirp signal, as received from UE 115, as achieving a threshold power, where the threshold power may be a configured threshold power, a dynamic threshold power set as a strength at which the chirp signal is received at another base station in the zone, etc. Thus, in one example, signal measuring component 346 can determine whether the strength of the chirp signal is strongest at base station 105 (e.g., based on receiving an indication of the strength of the chirp signal at other base stations in the zone), and if so, cell-specific signal transmitting component 340 can determine to transmit the cell-specific signal to the UE 115. In this example, base station 105 may determine itself to be the serving cell for the UE, and may be the only base station in the zone transmitting the cell-specific signal to the UE 115. This can facilitate determination of the serving physical cell identifier at the UE 115 based on receiving the cell-specific signal and identifying the physical cell identifier associated therewith. In another example, signal measuring component 346 can determine that the strength of the chirp signal is strong enough for the base station 105 to be considered a neighboring cell of a serving cell of the UE 115, and cell-specific signal transmitting component 340 can accordingly transmit a cell-specific signal.

In one example, cell-specific signal transmitting component 340 can determine to transmit a cell-specific signal based on one or more commands received from other cells/base stations or other network components. In this example, the other network components may determine which cell is to be the serving cell and which cells are to be neighboring cells based on the signal strength of the chirp signal as received at the cells. For example, a set of cells can be determined as cells at which the chirp signal is received at least at a threshold power. The cell in the set of the cells at which the chirp signal is strongest can be considered the serving cell, and the other cells can be considered neighboring cells. In an example, the cells can communicate the power of the chirp signal as received from the UE 115 (e.g., based on determining that the chirp signal is received) and can accordingly determine the serving cell and/or one or more neighboring cells for the UE 115 based on determining whether a given cell received the chirp signal at a highest power among the communicating cells.

The cells/base stations or other network components can accordingly cause the serving cell and/or the neighboring cells to send cell-specific signals. In one example, this may be based on receiving the chirp signal from the wireless device (which may specify to transmit the cell-specific signals). As described further herein, the wireless device (e.g., UE 115) may detect a positive paging indicator from the serving cell (e.g., based on the serving cell transmitting a cell-specific signal, as described further herein), and can accordingly trigger a neighbor physical cell identifier search procedure to discover neighboring physical cell identifiers based on receiving subsequently transmitted cell-specific signals from the cells determined to be neighboring cells.

Method 500 may also include, at Block 510, associating the cell-specific signal to a physical cell identifier. In an aspect, cell-specific signal transmitting component 340, or one or more components thereof, e.g., in conjunction with processor(s) 305, memory 302, and/or transceiver 370, can associate the cell-specific signal to the physical cell identifier to allow a device receiving the cell-specific signal to determine the identifier based on one or more properties of the cell-specific signal. For example, associating the cell-specific signal to the physical cell identifier at Block 510 may optionally include, at Block 512, scrambling the MRS based on a physical cell identifier. In an aspect, MRS scrambling component 342, e.g., in conjunction with processor(s) 305, memory 302, and/or transceiver 370, can scramble the MRS based on the physical cell identifier. For example, MRS scrambling component 342 can scramble the MRS using a scrambling code correlated to a physical cell identifier of a cell of base station 105. For example, the scrambling codes and physical cell identifiers may be associated in a table, as described above, which can be configured in the base station 105 (e.g., as stored in a memory 302 thereof). In another example, MRS scrambling component 342 can scramble the MRS using a scrambling code that is computed or otherwise pseudo-randomly determined based on the physical cell identifier (e.g., according to a function or formula configured at the base station 105). In any case, a device receiving the cell-specific signal can include or can be configured with information for determining the scrambling code and the associated physical cell identifier, as described further herein.

In another example, associating the cell-specific signal to the physical cell identifier, at Block 510, may optionally include, at Block 514, generating a sequence for the cell-specific signal based on a physical cell identifier. In an aspect, signal sequence generating component 344, e.g., in conjunction with processor(s) 305, memory 302, and/or transceiver 370, may generate the sequence for the cell-specific signal (e.g., the cell-specific synchronization signal, the MRS, etc.) based on the physical cell identifier. For example, signal sequence generating component 344 can generate the sequence as a binary sequence, an m-sequence, where m is a positive integer, a Zadoff-Chu sequence, other sequences with good cross-correlation properties, etc. to indicate the physical cell identifier. For example, the sequences and physical cell identifiers may be associated in a table, as described above, which can be configured in the base station 105 (e.g., as stored in a memory 302 thereof). In another example, signal sequence generating component 344 may compute or otherwise pseudo-randomly determine the sequence based on the physical cell identifier (e.g., according to a formula or function configured at the base station 105). The sequence can be of a specified length that allows for indicating a desired number of possible physical cell identifiers (e.g., length n to indicate $2^n$ physical cell identifiers in the case of a binary sequence). In this example, a device receiving the cell-specific signal can include or can be configured with instructions to appropriately decode the sequence of the cell-specific signal to determine the physical cell identifier.

Method 500 can also include, at Block 516, transmitting the cell-specific signal as part of operating in the zone of cells. In an aspect, cell-specific signal transmitting component 340, e.g., in conjunction with processor(s) 305, memory 302, and/or transceiver 370, can transmit the cell-specific signal as part of operating in the zone of cells. In this regard, for example, cell-specific signal transmitting component 340 can transmit the cell-specific signal to UE 115, which may occur without cell-specific signals transmitted from other cells in the zone (e.g., where signal measuring component 346 determines a strength of a signal received from the UE 115 achieves a threshold). In another example, cell-specific signal transmitting component 340 can transmit the cell-specific signal to UE 115 along with other base stations/cells transmitting cell-specific signals, where the cell-specific signals transmitted by the other base stations may be transmitted as, for example, MRSs scrambled with different scrambling codes corresponding to different physical cell identifiers, cell-specific synchronization signals generated with different sequences corresponding to different physical cell identifiers, etc. Accordingly, UE 115 can receive the cell-specific signal(s) and determine physical cell identifiers corresponding to the cells for various purposes (e.g., to communicate with the cell, perform interference cancellation, determine SNR of neighboring cells, perform mobility management, etc.).

Figure 7:
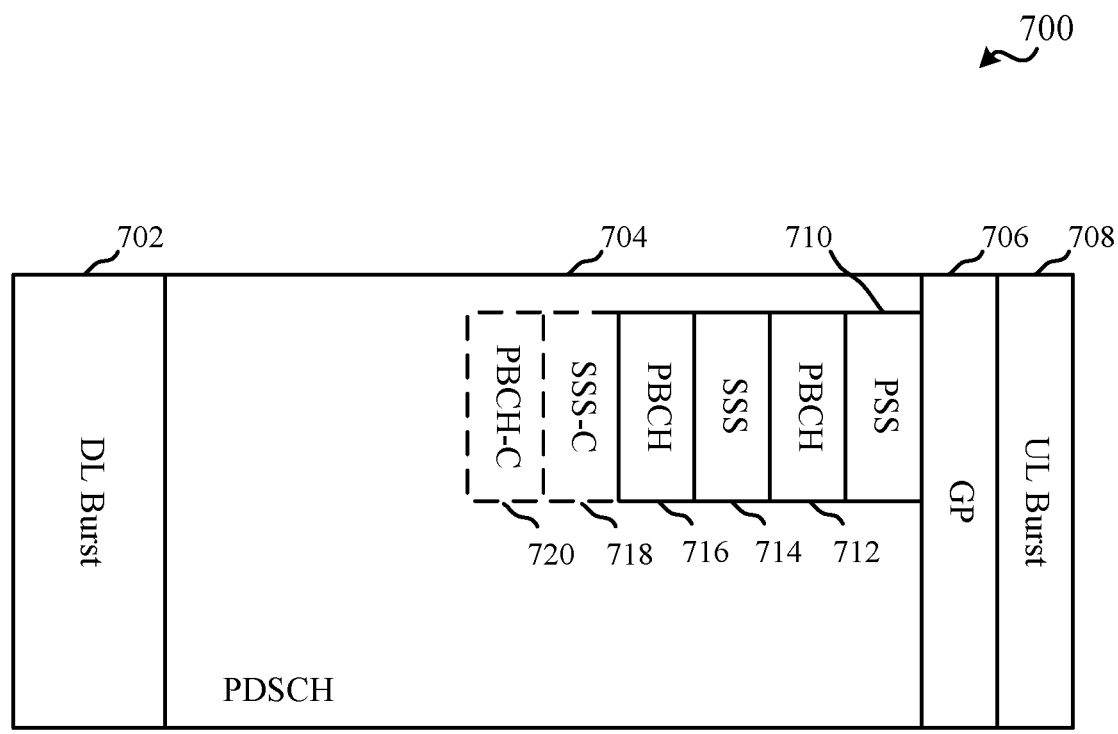
FIG. 7 is a block diagram illustrating an example of bandwidth used to transmit various synchronization signals in wireless communications, in accordance with various aspects of the present disclosure.

In one example, cell-specific signal transmitting component 340 can transmit the cell-specific signal as a cell-specific synchronization signal over a similar bandwidth used to transmit unified synchronization signals for the zone. An example is depicted in FIG. 7, which illustrates an example of a bandwidth 700 that can be allocated by one or more cells. For example, bandwidth 700 can include a plurality of symbols (e.g., OFDM symbols, SC-FDM symbols, etc.) corresponding to a period of time (e.g., a portion of a subframe, etc.). Bandwidth 700 includes a plurality of symbols allocated for a downlink burst 702, a plurality of symbols for a physical downlink shared channel (PDSCH) region 704, a guard period (GP) symbol 706, and a symbol allocated for an uplink burst 708. In this example, base station 105 can transmit a primary synchronization signal (PSS) 710, primary broadcast channel (PBCH) 712, secondary synchronization signal (SSS) 714, PBCH 716, etc. in one or more symbols in the PDSCH region 704, where the PSS 710, PBCH 712, SSS 714, and PBCH 716 may be unified and similarly transmitted by multiple base stations/cells in a zone.

In this example, cell-specific signal transmitting component 340 can also transmit a cell-specific SSS (SSS-C) 718, which can be generated using a sequence to indicate a physical cell identifier as described, in a similar portion of frequency of bandwidth 700 (e.g., 5 megahertz) used to transmit the unified PSS 710, PBCH 712, SSS 714, and/or PBCH 716. Moreover, in an example, cell-specific signal transmitting component 340 may transmit the SSS-C 718 adjacent in time (e.g., in an adjacent symbol) to one or more of the unified PSS 710, PBCH 712, SSS 714, and/or PBCH 716 (e.g., as part of a synchronization burst that includes unified PSS 710, PBCH 712, SSS 714, and/or PBCH 716). In another example, cell-specific signal transmitting component 340 may also transmit a cell-specific PBCH (PBCH-C) 720 in a similar portion of frequency of bandwidth 700 used to transmit the unified PSS 710, PBCH 712, SSS 714, and/or PBCH 716, the SSS-C 718, etc. (e.g., as part of a synchronization burst that includes unified PSS 710, PBCH 712, SSS 714, and/or PBCH 716, SSS-C 718, etc.). In an example, cell-specific signal transmitting component 340 may transmit the PBCH-C 720 adjacent in time (e.g., in an adjacent symbol) to the SSS-C 718 or one or more of the unified PSS 710, PBCH 712, SSS 714, and/or PBCH 716.

Referring back to FIG. 5, method 500 may also optionally include, at Block 518, transmitting neighboring physical cell identifiers in a system information signal. In an aspect, transceiver 370, e.g., in conjunction with processor(s) 305 and/or memory 302, can transmit neighboring physical cell identifiers in a system information signal. For example, UE 115 can communicate with the base station in a RRC-dedicated state as well (e.g., after sending the chirp signal and/or receiving resources for communicating with the base station). Transceiver 370 can transmit additional signals to the UE 115, such as system information signals to indicate system information for further communications with the base station 105 (e.g., master information blocks (MIB), system information blocks (SIB), etc.), which may include a list of neighboring physical cell identifiers. The further communications may include any suitable communications such as, for example, control channel communications (e.g., PDCCH), shared data channel communications, (e.g., PDSCH, etc.), and/or the like. As described, base station 105 and/or one or more related network components can determine a set of neighboring cells for the UE 115 based on a strength of the chirp signal as received at each of the cells. UE 115 can accordingly utilize the neighboring physical cell identifier information for one or more purposes (e.g., to perform interference cancellation, mobility management, etc.). In an example, the UE 115 can utilize the neighboring physical cell identifier information to determine the cells that the UE can attempt to discover henceforth, which may include one or more cells in the same zone as the serving cell. Thus, the UE need not continue searching for the cells (e.g., in the zone).

FIG. 6 illustrates a flow chart of an example of a method 600 for determining (e.g., by a UE) one or more physical cell identifiers associated with one or more received cell-specific signals.

At Block 602, method 600 includes determining to discover a physical cell identifier of one or more cells in a zone based at least in part on detecting a condition. In an aspect, physical cell identifier discovering component 440, e.g., in conjunction with processor(s) 405, memory 402, and/or transceiver 470, can determine to discover a physical cell identifier of one or more cells in a zone based at least in part on detecting a condition. For example, the condition may correspond to receiving one or more signals from one or more base stations, such as a unified synchronization signal, a keep alive message, and/or the like, determining to cancel interference from one or more neighboring cells, detecting a threshold change in SNR (e.g., SNR with a serving cell falls below a threshold), determining to perform mobility management, etc. Based on detecting the condition, physical cell identifier discovering component 440 can determine to attempt to receive one or more cell-specific signals, for example. Physical cell identifier discovering component 440 may also determine to discover the physical cell identifier based on acquiring synchronization with the zone, in an example, such that a timing for receiving the cell-specific signals can be determined based on the acquired synchronization. As another example, the physical cell identifier discovering component 440 may determine to discover the physical cell identifier based on acquiring synchronization with the zone such that a request for the cell-specific signals can be transmitted based on the acquired synchronization.

In this regard, method 600 may also optionally include, at Block 604, transmitting a signal to the one or more cells in the zone. In an aspect, physical cell identifier discovering component 440, e.g., in conjunction with processor(s) 405, memory 402, and/or transceiver 470, can transmit the signal to the one or more cells in the zone to cause transmission of one or more cell-specific signals by one or more base stations, as described above. For example, physical cell identifier discovering component 440 may transmit the signal based on detecting the condition, as described above. In an example, the signal can be a chirp signal that can indicate a purpose of the signal as being to cause transmission of cell-specific signals (e.g., specifically transmission of MRS or cell-specific synchronization signals or otherwise) by one or more base stations in the zone. In another example, the chirp signal may indicate other purposes (e.g., to perform random access with the base station 105). Accordingly, one or more base stations receiving the signal can transmit a cell-specific signal, which may include, for example, all base stations that receive the chirp signal, all base stations in a zone, the base station in the zone determined to receive the chirp signal at a highest signal strength among a plurality of base stations receiving the chirp signal (and thus may be considered the serving cell for the UE 115), etc.

Method 600 may also include, at Block 606, receiving a cell-specific signal from at least one of the one or more cells in the zone. In an aspect, cell-specific signal receiving component 442, e.g., in conjunction with processor(s) 405, memory 402, and/or transceiver 470, can receive the cell-specific signal from at least one of the one or more cells in the zone. For example, cell-specific signal receiving component 442 may receive a cell-specific signal from base station 105, which may indicate a physical cell identifier corresponding to the base station 105 and/or related cell. For example, as described, the cell-specific signal may be, for instance, a MRS scrambled signal based on the physical cell identifier of base station 105, a cell-specific synchronization signal generated based on a sequence corresponding to the physical cell identifier of base station 105, etc. In addition, cell-specific signal receiving component 442 may receive one cell-specific signal from a determined serving cell in the zone and/or may receive multiple cell-specific signals from multiple base stations (or related cells) in the zone. As described, in an example, cell-specific signal receiving component 442 may receive the cell-specific signal(s) in response to the signal transmitted by physical cell identifier discovering component 440 or may receive the cell-specific signal(s) periodically, etc. For instance, cell-specific signal receiving component 442 can open a measurement gap for receiving one or more cell-specific signals based on transmitting the signal to one or more base stations in the zone. As shown in FIG. 7, in one example, cell-specific signal receiving component 442 may receive a cell-specific synchronization signal as a SSS-C 718 transmitted using a similar portion of bandwidth 700 used for transmitting unified PSS 710, PBCH 712, SSS 714, and/or PBCH 716, PBCH-C 720, etc. (e.g., where SSS-C is transmitted as part of a synchronization burst that includes unified PSS 710, PBCH 712, SSS 714, and/or PBCH 716, PBCH-C 720, and/or the like).

Referring back to FIG. 6, method 600 may also include, at Block 608, associating the cell-specific signal with one of a plurality of cell-specific hypotheses. In an aspect, physical cell identifier determining component 444, e.g., in conjunction with processor(s) 405, memory 402, and/or transceiver 470, can associate the cell-specific signal with one of the plurality of cell-specific hypotheses. For example, the plurality of cell-specific hypotheses may include a plurality of possible scrambling codes for MRSs, which can each be associated to a physical cell identifier. In another example, the plurality of cell-specific hypotheses may include a plurality of possible sequences of cell-specific synchronization signals, which can each be associated to a physical cell identifier.

Accordingly, associating the cell-specific signal at Block 608 may optionally include, at Block 610, associating a MRS with a scrambling code hypothesis, or, at Block 612, associating a cell-specific signal with a sequence hypothesis. In either case, for example, physical cell identifier determining component 444, e.g., in conjunction with processor(s) 405, memory 402, and/or transceiver 470, can associate the MRS with the scrambling code hypothesis or the cell-specific signal (e.g., the cell-specific synchronization signal or the MRS), which can be based at least in part on determining a scrambling code or sequence that most closely correlates with the received cell-specific signal. In one example, physical cell identifier determining component 444 can compare the received cell-specific signal to each of the cell-specific hypotheses (e.g., the scrambling codes or sequences) to determine the hypothesis (e.g., the scrambling code or sequence) to which the cell-specific signal most closely corresponds.

For example, physical cell identifier determining component 444 can decode a MRS using correlation, energy detection, etc. For example, physical cell identifier determining component 444 can detect peaks in the received bandwidth as MRSs, and can determine the peaks to be potential cell-specific signals. In another example, physical cell identifier determining component 444 can similarly decode a cell-specific signal (e.g., the cell-specific synchronization signal, MRS, etc.) using correlation, energy detection, etc.

Method 600 may also include, at Block 614, determining the physical cell identifier that corresponds to the cell-specific hypothesis. In an aspect, physical cell identifier determining component 444, e.g., in conjunction with processor(s) 405, memory 402, and/or transceiver 470, can determine the physical cell identifier that corresponds to the cell-specific hypothesis. For example, physical cell identifier determining component 444 may store a mapping of the cell-specific hypotheses to corresponding identifiers in a table 446, which may be configured in the UE 115 (e.g., stored in a memory 402, such as a memory chip, subscriber identity module, etc.). In another example, physical cell identifier determining component 444 may store a function or formula to compute or otherwise pseudo-randomly determine the physical cell identifier for a determined cell-specific hypothesis. In either case, physical cell identifier determining component 444 can determine the physical cell identifier from the table 446 or based on computing the physical cell identifier that is associated with the cell-specific hypothesis (e.g., the scrambling code or sequence of the received cell-specific signal). In addition, physical cell identifier determining component 444 may similarly determine physical cell identifiers for one or more additionally received cell-specific signals. In an example, physical cell identifier determining component 444 may also determine or verify the physical cell identifier based on attempting to decode a cell-specific channel using the physical cell identifier (e.g., a PDCCH, PBCH (e.g., PBCH-C 720), etc.

In one example, determining the physical cell identifier at Block 614 may optionally include, at Block 616, determining the physical cell identifier as the serving physical cell identifier. In an aspect, serving cell determining component 448, e.g., in conjunction with processor(s) 405, memory 402, and/or transceiver 470, can determine the physical cell identifier as the serving physical cell identifier. In one example, cell-specific signal receiving component 442 may receive one cell-specific signal (e.g., from the cell determined to receive a chirp message from UE 115 at the strongest power), and serving cell determining component 448 can determine the associated cell (identified by the physical cell identifier determining component 444) as the serving cell. In another example, serving cell determining component 448 may determine the serving cell as the cell from which the cell-specific signal is received at a highest signal power (e.g., RSSI, RSRP, RSRQ, SNR, etc.), and physical cell identifier determining component 444 can determine the associated physical cell identifier, as described above. In any case, UE 115 can utilize the serving physical cell identifier for various purposes, such as to decode a corresponding communications channel (e.g., control channel) from the base station 105. In one example, determining the physical cell identifier as the serving physical cell identifier may cause the cell-specific signal receiving component 442 to detect the cell-specific signal as a positive paging indicator, and cell-specific signal receiving component 442 may accordingly trigger a neighboring physical cell identifier search procedure to receive additional cell-specific signals from neighboring cells and/or a request for neighboring physical cell identifiers from the serving cell, as described further herein.

In another example, determining the physical cell identifier at Block 614 may optionally include, at Block 618, determining one or more neighboring physical cell identifiers. In an aspect, physical cell identifier determining component 444, e.g., in conjunction with processor(s) 405, memory 402, and/or transceiver 470, can determine the one or more neighboring physical cell identifiers. For example, physical cell identifier determining component 444 can determine physical cell identifiers for multiple cell-specific signals that are not determined to be serving physical cell identifiers as neighboring physical cell identifiers. In an example, UE 115 can utilize the neighboring physical cell identifiers (e.g., in conjunction with the serving physical cell identifier or otherwise) to perform additional functions, such as interference cancellation, determination of SNR of neighboring cells (e.g., to evaluate the cells for handover), mobility management, etc.

In a specific example, cell-specific signal receiving component 442 may receive and measure a plurality of cell-specific signals from a plurality of cells in a zone, and physical cell identifier determining component 444 may associate the cell-specific signals with associated physical cell identifiers, as described. In this example, cell-specific signal receiving component 442 may also compute an energy for each cell-specific signal at an output of the RF front end 490, RX radio 480, etc. (e.g., at a correlator output), and may compare the detected energy to a threshold to mitigate the occurrence of false alarm signals (e.g., signals that are not MRSs and/or not from the zone). For example, the threshold may be set based on a history of receiving the signals and determining whether the signals correspond to any of the MRS scrambling codes or sequences in the table 446. Accordingly, the threshold may be set to achieve a certain false alarm rate (e.g., 1%, 2%, etc.) balanced with mitigating incorrectly determining an actual cell-specific signal as a false alarm. In any case, physical cell identifier determining component 444 can create a list of physical cell identifiers corresponding to cell-specific signals that achieve the threshold energy as the list of neighboring physical cell identifiers.

Method 600 may also optionally include, at Block 620, determining a serving physical cell identifier based on decoding a received control channel using the physical cell identifier or one or more other physical cell identifiers. In an aspect, control channel decoding component 450 e.g., in conjunction with processor(s) 405, memory 402, and/or transceiver 470, can determine the serving physical cell identifier based on decoding the received control channel using the physical cell identifier or one or more other physical cell identifiers. For example, control channel decoding component 450 can attempt to decode a control and/or data channel (e.g., PDCCH, PDSCH, PBCH-C 720, etc.) received from base station 105 or another base station starting with a physical cell identifier corresponding to the cell-specific signal received at the highest signal power. If the decoding fails, control channel decoding component 450 can attempt to decode the control channel with a physical cell identifier corresponding to the cell-specific signal received at the next highest signal power, and so on until the control channel is successfully decoded. Where the decoding succeeds, serving cell determining component 448 can determine the serving physical cell identifier as the physical cell identifier that results in successful decoding of the control channel, and may cease the serving cell discovery process. As described, for example, UE 115 may initiate other processes based on determining the serving physical cell identifier, such as a neighboring cell discovery process, a request for a list of neighboring cells, etc.

Method 600 may also optionally include, at Block 622, receiving neighboring physical cell identifiers in a system information signal. In an aspect, physical cell identifier discovering component 440, e.g., in conjunction with processor(s) 405, memory 402, and/or transceiver 470, can receive neighboring physical cell identifiers in a system information signal. As described, base station 105 may transmit the system information signal as part of RRC-dedicated signaling, control channel or shared data channel signaling, etc., once UE 115 establishes a connection with base station 105 (e.g. as its serving cell). Moreover, in an example, physical cell identifier determining component 444 may transmit a request for the neighboring physical cell identifiers to the determined serving cell.

Figure 8:
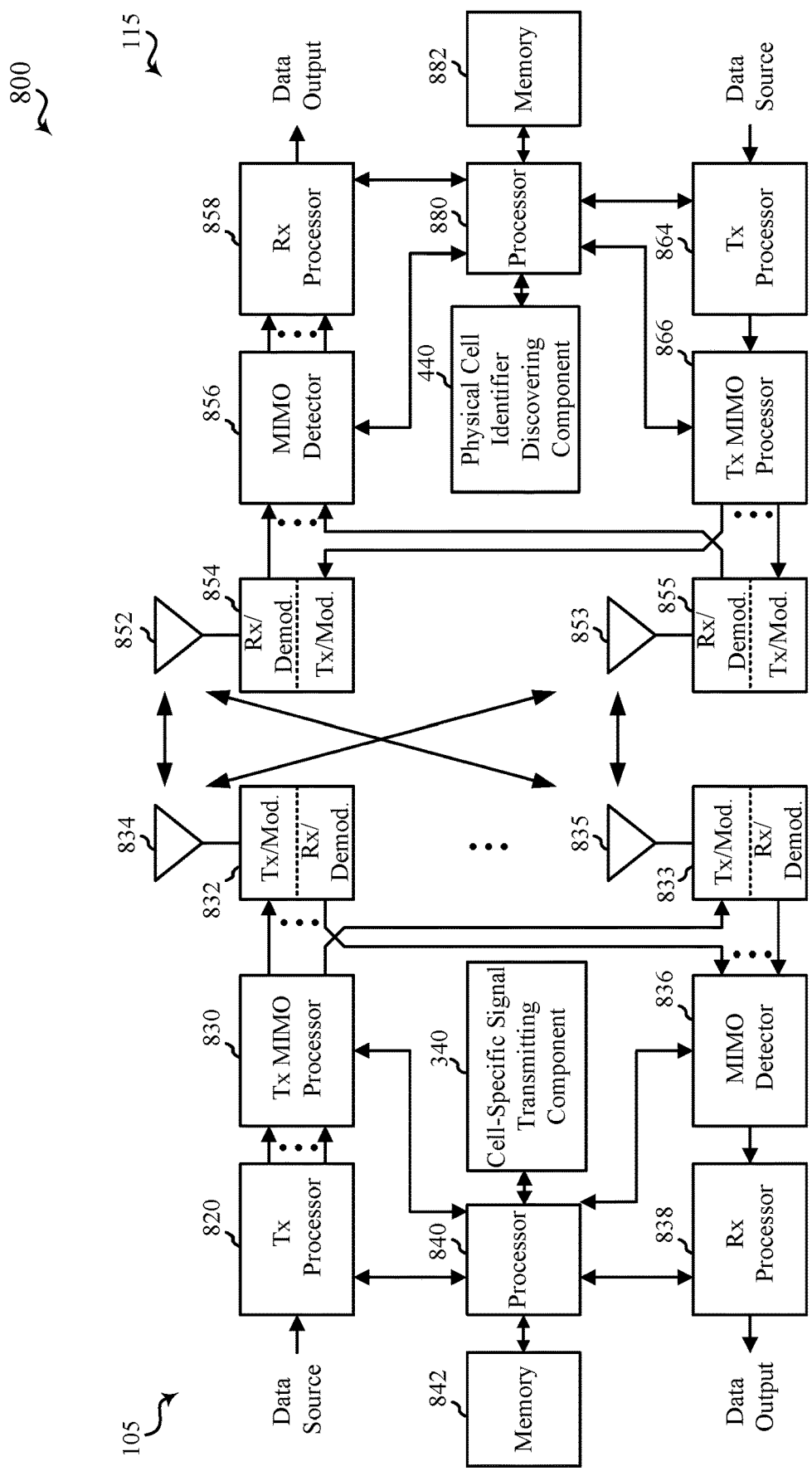
FIG. 8 is a block diagram illustrating an example of a MIMO communication system including a base station and a UE, in accordance with various aspects of the present disclosure.

FIG. 8 is a block diagram of a MIMO communication system 800 including a base station 105 and a UE 115. The MIMO communication system 800 may illustrate aspects of the wireless communication system 100 and diagram 200 described with reference to FIGS. 1 and 2. The base station 105 may be an example of aspects of the base station 105 described with reference to FIGS. 1, 2, and 3. The base station 105 may be equipped with antennas 834 and 835, and the UE 115 may be equipped with antennas 852 and 853. In the MIMO communication system 800, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 115 may be an example of aspects of the UEs 115 described with reference to FIGS. 1, 2, and 4. At the UE 115, the UE antennas 852 and 853 may receive the DL signals from the base station 105 and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 115 to a data output, and provide decoded control information to a processor 880, or memory 882.

The processor 880 may in some cases execute stored instructions to instantiate a physical cell identifier discovering component 440 (see e.g., FIGS. 1, 2, and 4).

On the uplink (UL), at the UE 115, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the base station 105 in accordance with the communication parameters received from the base station 105. At the base station 105, the UL signals from the UE 115 may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 may in some cases execute stored instructions to instantiate a cell-specific signal transmitting component 340 (see e.g., FIGS. 1, 2, and 3).

The components of the UE 115 may, individually or collectively, be implemented with one or more ASICs adapted to perform some or all of the applicable functions in hardware. Each of the noted modules may be a means for performing one or more functions related to operation of the MIMO communication system 800. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 800.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communications, comprising:
   receiving, in a portion of bandwidth, a unified synchronization signal from one or more cells in a zone, wherein the unified synchronization signal identifies the zone, which includes multiple cells; and
   receiving, in the portion of bandwidth, a cell-specific signal from a cell of the one or more cells in the zone, wherein the cell-specific signal identifies the cell.

2. The method of claim 1, wherein receiving the unified synchronization signal and receiving the cell-specific signal includes receiving a synchronization burst from the cell, wherein the synchronization burst includes the unified synchronization signal and the cell-specific signal.

3. The method of claim 2, wherein receiving the synchronization burst comprises receiving the synchronization burst in one or more symbols of a physical downlink shared channel region.

4. The method of claim 3, further comprising transmitting an uplink burst following a guard period after the physical downlink shared channel region.

5. The method of claim 1, wherein the cell-specific signal includes one or more of a secondary synchronization signal (SSS) or a physical broadcast channel (PBCH) specific to the cell.

6. The method of claim 5, wherein the unified synchronization signal includes one or more of a primary synchronization signal (PSS), SSS, or PBCH corresponding to the one or more cells in the zone.

7. The method of claim 1, further comprising:
   associating the cell-specific signal with one of a plurality of possible scrambling codes or sequences; and
   determining a physical cell identifier of the cell as one of a plurality of physical cell identifiers that corresponds to the one of the plurality of possible scrambling codes or sequences.

8. The method of claim 1, further comprising determining a serving cell based on a physical cell identifier corresponding to the cell-specific signal, wherein the cell-specific signal is determined to be a strongest cell-specific signal of a plurality of received cell-specific signals.

9. The method of claim 8, further comprising receiving an indication of one or more neighboring physical cell identifiers from the serving cell.

10. The method of claim 9, further comprising determining one or more cells to discover based at least in part on the indication of the one or more neighboring physical cell identifiers.

11. An apparatus for wireless communications, comprising:
    a transceiver for transmitting or receiving one or more signals via one or more antennas;
    a memory configured to store instructions; and
    a processor coupled to the transceiver and the memory, the processor being configured to execute the instructions to:
    receive, in a portion of bandwidth, a unified synchronization signal from one or more cells in a zone, wherein the unified synchronization signal identifies the zone, which includes multiple cells; and
    receive, in the portion of bandwidth, a cell-specific signal from a cell of the one or more cells in the zone, wherein the cell-specific signal identifies the cell.

12. The apparatus of claim 11, the processor being configured to execute the instructions to receive the unified synchronization signal and receive the cell-specific signal at least in part by receiving a synchronization burst from the cell, wherein the synchronization burst includes the unified synchronization signal and the cell-specific signal.

13. The apparatus of claim 12, the processor being further configured to execute the instructions to receive the synchronization burst in one or more symbols of a physical downlink shared channel region.

14. The apparatus of claim 13, the processor being further configured to execute the instructions to transmit transmitting an uplink burst following a guard period after the physical downlink shared channel region.

15. The apparatus of claim 12, wherein the cell-specific signal includes one or more of a secondary synchronization signal (SSS) or a physical broadcast channel (PBCH) specific to the cell.

16. The apparatus of claim 15, wherein the unified synchronization signal includes one or more of a primary synchronization signal (PSS), SSS, or PBCH corresponding to the one or more cells in the zone.

17. The apparatus of claim 11, the processor being further configured to execute the instructions to:
- associate the cell-specific signal with one of a plurality of possible scrambling codes or sequences; and
- determine a physical cell identifier of the cell as one of a plurality of physical cell identifiers that corresponds to the one of the plurality of possible scrambling codes or sequences.

18. The apparatus of claim 11, the processor being further configured to execute the instructions to determine a serving cell based on a physical cell identifier corresponding to the cell-specific signal, wherein the cell-specific signal is determined to be a strongest cell-specific signal of a plurality of received cell-specific signals.

19. The apparatus of claim 18, the processor being further configured to execute the instructions to receive an indication of one or more neighboring physical cell identifiers from the serving cell.

20. The apparatus of claim 19, the processor being further configured to execute the instructions to determine one or more cells to discover based at least in part on the indication of the one or more neighboring physical cell identifiers.

21. An apparatus for wireless communications, comprising:
- means for receiving, in a portion of bandwidth, a unified synchronization signal from one or more cells in a zone, wherein the unified synchronization signal identifies the zone, which includes multiple cells; and
- means for receiving, in the portion of bandwidth, a cell-specific signal from a cell of the one or more cells in the zone, wherein the cell-specific signal identifies the cell.

22. The apparatus of claim 21, wherein the means for receiving the unified synchronization signal and the means for receiving the cell-specific signal receive a synchronization burst from the cell, wherein the synchronization burst includes the unified synchronization signal and the cell-specific signal.

23. The apparatus of claim 22, wherein the means for receiving the synchronization burst receives the synchronization burst in one or more symbols of a physical downlink shared channel region.

24. The apparatus of claim 23, further comprising means for transmitting an uplink burst following a guard period after the physical downlink shared channel region.

25. The apparatus of claim 21, wherein the cell-specific signal includes one or more of a secondary synchronization signal (SSS) or a physical broadcast channel (PBCH) specific to the cell, and wherein the unified synchronization signal includes one or more of a primary synchronization signal (PSS), SSS, or PBCH corresponding to the one or more cells in the zone.

26. A non-transitory computer-readable medium, comprising code executable by one or more processors for wireless communication, the code comprising code for:
- receiving, in a portion of bandwidth, a unified synchronization signal from one or more cells in a zone, wherein the unified synchronization signal identifies the zone, which includes multiple cells; and
- receiving, in the portion of bandwidth, a cell-specific signal from a cell of the one or more cells in the zone, wherein the cell-specific signal identifies the cell.

27. The non-transitory computer-readable medium of claim 26, wherein the code for receiving the unified synchronization signal and the code for receiving the cell-specific signal receive a synchronization burst from the cell, wherein the synchronization burst includes the unified synchronization signal and the cell-specific signal.

28. The non-transitory computer-readable medium of claim 27, wherein the code for receiving the synchronization burst receives the synchronization burst in one or more symbols of a physical downlink shared channel region.

29. The non-transitory computer-readable medium of claim 28, further comprising code for transmitting an uplink burst following a guard period after the physical downlink shared channel region.

30. The non-transitory computer-readable medium of claim 26, wherein the cell-specific signal includes one or more of a secondary synchronization signal (SSS) or a physical broadcast channel (PBCH) specific to the cell, and wherein the unified synchronization signal includes one or more of a primary synchronization signal (PSS), SSS, or PBCH corresponding to the one or more cells in the zone.

* * * * *